US012351883B2

(12) United States Patent
Schneider et al.

(10) Patent No.: US 12,351,883 B2
(45) Date of Patent: Jul. 8, 2025

(54) COOLING PLATE FOR A METALLURGICAL FURNACE

(71) Applicants: PAUL WURTH S.A., Luxembourg (LU); PAUL WURTH DEUTSCHLAND GMBH, Wiesbaden (DE)

(72) Inventors: Rene Schneider, Goch (DE); Marco Ricke, Coesfeld (DE)

(73) Assignees: PAUL WURTH S.A., Luxembourg (LU); PAUL WURTH DEUTSCHLAND GMBH, Wiesbaden (DE)

(*) Notice: Subject to any disclaimer, the term of this patent is extended or adjusted under 35 U.S.C. 154(b) by 488 days.

(21) Appl. No.: 17/787,747

(22) PCT Filed: Dec. 18, 2020

(86) PCT No.: PCT/EP2020/086980
§ 371 (c)(1),
(2) Date: Jun. 21, 2022

(87) PCT Pub. No.: WO2021/123133
PCT Pub. Date: Jun. 24, 2021

(65) Prior Publication Data

US 2023/0077841 A1 Mar. 16, 2023

(30) Foreign Application Priority Data

Dec. 18, 2019 (EP) .................................. 19217561.0

(51) Int. Cl.
*C21B 7/10* (2006.01)
*C21C 5/46* (2006.01)
(Continued)

(52) U.S. Cl.
CPC ................ *C21B 7/106* (2013.01); *C21C 5/46* (2013.01); *C21C 5/4646* (2013.01); *F27B 1/24* (2013.01);
(Continued)

(58) Field of Classification Search
CPC ......... C21B 7/106; C21C 5/4646; C21C 5/46; F27B 1/24; F27B 3/24; F27D 2009/0067; F27D 1/12; F27D 2009/0018; F27D 9/00
(Continued)

(56) References Cited

U.S. PATENT DOCUMENTS 4,382,585 A * 5/1983 Fischer ..................... C21B 7/10 266/190
5,650,119 A * 7/1997 Hille ......................... C21B 7/10 266/190
(Continued)

FOREIGN PATENT DOCUMENTS

AT A16552001 A 11/2002
EP 1466989 A2 10/2004
(Continued)

OTHER PUBLICATIONS

International Search Report issued Apr. 12, 2021 re: Application No. PCT/EP2020/086980, pp. 1-3, citing: JP S62 25796 U, WO 00/36154 A1 and JP S57 16781 A.
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

A metallurgical furnace cooling plate includes a cooling plate body with front and rear faces and at least one coolant channel inside the body, which communicates with a rear opening on the rear face; and a connection pipe connected to
(Continued)

the body so that a pipe channel of the connection pipe communicates with the coolant channel, the connection pipe adapted for carrying coolant fluid to or from the channel.

The body includes a receiving bore extending in a bore direction from the rear opening into the coolant channel, the channel being spaced in the bore direction from the rear face by a cover thickness of a cover portion and extends in the bore direction over a width. A connection pipe end portion extends into the receiving bore beyond the cover thickness and is form-fittingly received in the receiving bore along at least a portion of a width of the channel.

21 Claims, 6 Drawing Sheets

(51) Int. Cl.

*F27B 1/24* (2006.01)
*F27B 3/24* (2006.01)
*F27D 1/12* (2006.01)
*F27D 9/00* (2006.01)

(52) U.S. Cl.

CPC .................. *F27B 3/24* (2013.01); *F27D 1/12* (2013.01); *F27D 2009/0018* (2013.01); *F27D 2009/0067* (2013.01)

(58) Field of Classification Search

USPC .................................. 266/46, 190, 193, 194
See application file for complete search history.

(56) References Cited

U.S. PATENT DOCUMENTS

| | | | | |
|---|---|---|---|---|
| 7,204,953 B2 * | 4/2007 | Dratner | F27D 1/12 266/194 |
| 7,537,724 B2 * | 5/2009 | Stastny | C21B 7/10 266/194 |
| 7,549,463 B1 | 6/2009 | Schmeler et al. | |
| 2005/0218569 A1 | 10/2005 | Stastny et al. | |
| 2007/0013113 A1 * | 1/2007 | Heinrich | F27D 1/12 266/190 |
| 2011/0146903 A1 * | 6/2011 | Stauffer | B29C 66/8262 156/272.8 |

FOREIGN PATENT DOCUMENTS

| | | |
|---|---|---|
| JP | S5716781 A | 1/1982 |
| JP | S6225796 A | 10/1987 |
| JP | 2005535865 A | 11/2005 |
| JP | 2006037223 A | 2/2006 |
| JP | 2014227564 A | 12/2014 |
| WO | 0036154 A1 | 6/2000 |
| WO | 2018146021 A1 | 8/2018 |

OTHER PUBLICATIONS

Written Opinion issued Apr. 12, 2021 re: Application No. PCT/EP2020/086980, pp. 1-5, citing: JP S62 25796 U, WO 00/36154 A1 and JP S57 16781 A.

Chinese Office Action for Chinese Application No. 202080089657.3, dated Apr. 19, 2023, 6 pages.

Japanese Office Action for Application No. 2022-537569, dated Feb. 4, 2025, 8 pages with translation.

* cited by examiner

COOLING PLATE FOR A METALLURGICAL FURNACE

TECHNICAL FIELD

The disclosure relates to a cooling plate for a metallurgical furnace and to a method for manufacturing such a cooling plate.

BACKGROUND ART

Cooling plates, also called cooling staves, are used in metallurgical furnaces, e.g. in blast furnaces, as part of a cooling system of the furnace. They are arranged on the inside of the outer shell of the furnace and their surface facing the interior of the furnace can be lined with a refractory material. The cooling plates have internal coolant channels that are connected to other parts of the cooling system, e.g. by connection pipes which supply a coolant like water. The connection pipes are guided through boreholes in the outer steel shell of the furnace. According to one design, the cooling staves as well as the connection pipes are made of copper (or a copper alloy).

Currently, the connection between the copper pipe and the copper stave body is carried out in such a way that a weld seam preparation and a small countersink are prefabricated on the copper stave body. The countersink serves to provide a positioning and a flat support surface for the connection pipe. The weld preparation is carried out in such a way that an HV weld (single bevel groove weld) can be produced between the cooling tube and the copper stave body. This weld joint, however, is a weak point. Due to wear and thermal stress during operation, the copper stave bodies deform, e.g. into a bent or “banana” shape. Due to this deformation, the position and the angle of the cooling tubes change with respect to the outer shell of the blast furnace.

In order to absorb a certain part of this deformation and to close the holes of the blast furnace shell gas-tight, it is known to weld a so-called compensator between the outer shell and the cooling tubes, as is disclosed e.g. in EP 1 466 989. This compensator, which forms a kind of collar around the connection pipe, can only absorb a certain degree of deformation. If this degree of deformation is exceeded, the compensator forms a fix point for the connection pipe. During the operation of the furnace, the stave body often deforms even further, which results in a load on the connection pipe. This load is transferred from the fix point to the connection between the stave body and the connection pipe and thus into the weld. This, in turn, can lead to cracks in the weld, resulting in leakage and thus in water entering the furnace.

SUMMARY

The present disclosure therefore provides means for preventing leakage in a cooling system of a metallurgical furnace. This issue is solved by providing a cooling plate and a method according to the independent claims.

The disclosure provides a cooling plate for a metallurgical furnace. The furnace may be a shaft furnace, in particular a blast furnace. It is understood that the cooling plate, when installed to the metallurgical furnace, facilitates cooling of an outer shell of the furnace.

The cooling plate comprises a cooling plate body with a front face for facing the inside of the metallurgical furnace, an opposite rear face and at least one coolant channel inside the cooling plate body, which coolant channel communicates with a rear opening on the rear face. The cooling plate, which can also be referred to as a cooling panel or cooling stave, is normally intended for installation inside an outer shell of the metallurgical furnace. In assembled state, the cooling plate may be arranged in parallel or concentric to the outer shell. The cooling plate body may be made of a single piece of metal, e.g. by casting. Although the disclosure is not limited to this, the cooling plate body is preferably made of a metal that comprises copper, i.e. it is made of copper or a copper alloy. It has a front face for facing the inside of the metallurgical furnace, i.e. in assembled state, the front face is oriented towards the inside of the furnace. In order to increase the surface area of the front surface, the front surface may comprise a plurality of ribs, with two consecutive ribs being spaced by a groove. The cooling plate body further comprises a rear face arranged opposite to the front face, i.e. the rear face faces the outside of the metallurgical furnace. When the cooling plate is installed inside the outer shell of the furnace, the rear face faces the outer shell. Normally, the cooling system of the metallurgical furnace comprises a plurality of cooling plates which more or less protect the entire outer shell from excessive heat. Optionally, at least one surface of the cooling plates could be provided with a refractory lining to protect the surface from excessive heat and/or mechanical abrasion. At least one coolant channel is disposed inside the cooling plate body. The coolant channel is an elongate cavity inside the cooling plate body and is normally straight. In particular, it may have a circular or oblong cross-section. It is understood that the coolant channel is designed to contain and guide a coolant, e.g. water.

The cooling plate further comprises a connection pipe connected to the cooling plate so that a pipe channel of the connection pipe communicates with the coolant channel said connection pipe being adapted for carrying coolant fluid to or from said coolant channel. The connection pipe is normally made of a single piece of metal and has a predetermined length. The length of the connection pipe can vary and is generally selected to be sufficient to extend from the backs side of the cooling plate body through outer shell, protruding outside of the blast furnace proper for connection to the cooling system. Like the cooling plate body, the connection pipe is preferably made of a metal that comprises copper, i.e. it is made of copper or a copper alloy. Although the disclosure is not limited to this, the connection pipe preferably has a circular cross-section. It has a pipe channel or inner duct, which normally also has a circular cross-section. To the outside, the pipe channel is delimited by a pipe wall of the connection pipe. The connection pipe is connected to the cooling plate body so that the pipe channel communicates with the coolant channel. Here and in the following, “communicate” refers to an arrangement that allows for coolant exchange. In other words, the coolant channel and the pipe channel are connected so that coolant can flow from the coolant channel to the pipe channel and vice versa, i.e. the connection pipe is adapted for carrying coolant (i.e. coolant fluid) to or from the coolant channel.

The cooling plate further comprises a receiving bore that extends in a bore direction from the rear opening into the coolant channel, wherein, at least adjacent the receiving bore on a first side thereof, the coolant channel is spaced in the bore direction from the rear face by a cover thickness of a cover portion and extends in the bore direction over a width. The term “receiving bore” is not to be construed in that this has to be formed by boring or drilling, although this is a preferred way of forming the receiving bore. The receiving bore extends in a bore direction, which may also correspond to a symmetry axis of the receiving bore. It extends from the rear opening into the coolant channel, which includes the possibility that it extends even beyond the coolant channel. The shape of the receiving bore is generally not limited, but it preferably has a circular cross-section. In this context, the width of the coolant channel is its dimension measured along the bore direction. Usually, the bore direction is perpendicular to the axis of the coolant channel, so that for a circular cross-section, the width of the coolant channel corresponds to its diameter. Also with respect to the bore direction, the coolant channel is spaced from the rear face by a cover thickness of a cover portion. In other words, the coolant channel is separated from the rear face by a cover portion of the cooling plate body, and the cover portion has a thickness (in the bore direction) which is referred to as the cover thickness. Oftentimes, the coolant channel is parallel to the rear face so that the cover thickness is constant over the entire length of the coolant channel, which also applies to the width of the coolant channel. If the cover thickness and/or the width is not constant, these terms specifically refer to the cover thickness and width of the coolant channel adjacent the receiving bore and on a first side of the receiving bore. As will be explained below, in some embodiments, the cover portion may not be present on a second side of the receiving bore (opposite the first side). In other embodiments, the cover portion is present on both sides of the receiving bore, wherein the cover thickness is normally the same on both sides.

An end portion of the connection pipe extends into the receiving bore in the bore direction beyond the cover thickness and is form-fittingly received in the receiving bore along at least a portion of the width of the coolant channel, which form fit advantageously prevents movement perpendicular to the bore direction with respect to the cooling plate body, wherein the pipe channel is straight in the end portion. The form fit of course refers to at least one direction perpendicular to the bore direction, preferably to any direction perpendicular to the bore direction. The inner dimensions of the receiving bore and the outer dimensions of the end portion are adapted so that the end portion cannot move perpendicular to the bore direction (or only to a negligible extent). Normally, the cross-section of the receiving bore corresponds more or less to the cross-section of the connection pipe. For instance, if the connection pipe has a circular cross-section, the same applies to the receiving bore.

More specifically, the end portion extends into the receiving bore beyond the cover thickness and is form-fittingly received along at least a portion of a width of the coolant channel in the bore direction. It is understood that the receiving bore extends through the cover portion and along at least a portion of the width of the coolant channel. Since the form-fitting connection is not only present locally, but along at least a portion of the width of the coolant channel, the connection cannot only receive or transfer forces perpendicular to the bore direction but also torques about an axis perpendicular to the bore direction. Furthermore, any force transfer between the end portion of the connection pipe and the coolant plate does not occur locally, but along a certain length or area. Therefore, local pressure and stress are greatly reduced. In contrast to prior art, the force transfer is not concentrated on a single, one-dimensional welding seam. Therefore, even if the cooling plate body (and/or the connection pipe) deforms significantly during operation of the cooling plate, the connection between the connection pipe and the cooling plate body can be maintained. Since the connection pipe is inserted deeply into the receiving bore (namely through the cover portion, beyond the cover thickness that separates the coolant channel from the rear face) and the form-fitting connection is at least partially established in the region of the coolant channel (i.e. along its width), a secure connection can be established without the need to extend the cooling plate body e.g. by providing a collar or the like at the rear face. Rather, the rear face can have a simple, flat shape, which facilitates the manufacturing process and reduces production costs. It is also beneficial that the pipe channel is straight in the end portion, i.e., it has no bends or the like which would complicate the production of the end portion and could also possibly make insertion of the end portion into the receiving bore more complicated. At least in some embodiments, the pipe channel is straight along its entire length. Also, the pipe channel normally has an end-side opening along its axial direction, corresponding to an open-ended pipe.

Although a form fit as such may be enough to guarantee a sufficiently stable connection between the connection pipe and the cooling plate body, it is preferred that the end portion is press-fitted into the receiving bore. In other words, the outer dimensions of the connection pipe are chosen to be somewhat greater than the inner dimensions of the receiving bore. For instance, if both the receiving bore and the connection pipe have a circular cross-section, an outer radius of the connection pipe is selected to be somewhat greater (e.g. by several tenths of a millimeter or a few millimeters) than the inner radius of the receiving bore. Thus, the connection pipe and/or the cooling plate body around the receiving bore have to be deformed in order to insert the end portion of the connection pipe. Not only does this press fit increase the stability of the mechanical connection, but it may also increase the tightness of the connection with respect to the coolant.

It is understood that the reliability of the connection between the cooling plate body and the connection pipe can be enhanced by increasing the length along which the end portion is received in the receiving bore. According to a preferred embodiment, the end portion is form-fittingly received in the receiving bore along at least 50% of the width of the coolant channel. One could also say that in this embodiment, the receiving bore and the end portion extends at least halfway through the coolant channel. More preferably, the end portion can be form-fittingly received in the receiving bore along the entire width of the coolant channel.

In particular, the receiving bore and the end portion can extend in the bore direction beyond the coolant channel. One could also say that they extend through the coolant channel or that they extend beyond the cover thickness and the width of the coolant channel. The receiving bore may comprise a plain end surface against which the end portion of the connection pipe abuts.

Although the mechanical stability of the connection between the connection pipe and the cooling plate body is mainly established via the form fit, especially when the connection pipe is press-fitted into the receiving bore, it is mostly desirable to supplement the connection, in particular in order to guarantee a fluid-tightness with respect to the coolant. It is therefore preferred that the connection pipe is connected to the cooling plate body by a welding connection proximate to the rear opening. The welding connection may particular comprise a closed, annular welding seam around the rear opening. On the one hand, the welding connection strengthens the mechanical connection between the cooling plate body and the connection pipe. Normally though, the most important function of the welding connection is to provide a fluid-tight seal. It should be noted that any mechanical stresses are mostly absorbed by the form-fitting connection, wherefore the stresses on the welding connection are highly reduced with respect to prior art. Other options for improving sealing and connection strength at the interface between the connection pipe and the cooling plate body (or the receiving bore, respectively) are gluing or threading.

Preferably, the cooling plate body comprises a countersink circumferentially disposed around the rear opening, wherein the welding connection is disposed inside the countersink. The countersink normally has an annular shape. Its outer diameter may decrease in a direction towards the front face, so that a V-shaped cross-section of the countersink is formed between the pipe wall of the connection pipe and the cooling plate body. Again, it is preferred that the welding connection comprises a closed, annular welding seam. In particular it may be a HV weld (single bevel groove weld).

Depending on how far the connection pipe is inserted into the cooling plate body, it may be possible that its pipe wall is circular in the entire end portion. However, if the connection pipe is inserted further into the cooling plate body, its pipe wall could potentially block a significant part of the cross-section of the coolant channel, which is generally undesirable. In order to avoid this, it is preferred that the pipe wall of the connection pipe comprises at least one lateral opening through which the pipe channel communicates with the coolant channel. The lateral opening may be a recess near the edge of the end portion. In particular it may be a through-hole that traverses the pipe wall.

In order to provide for the least possible disturbance of the coolant flow, it is preferred that a cross-section of the at least one lateral opening corresponds to a cross-section of the coolant channel and the at least one lateral opening is aligned with the coolant channel. In other words, the respective lateral opening could be considered as a continuation of the coolant channel since it has the same cross-section and is aligned with the coolant channel. If the cross-section of the lateral opening is a little smaller (e.g. 10% smaller) than the cross-section of the coolant channel, this may have a minor influence on the coolant flow and may still lead to a satisfactory performance. Also, the cross-section of the lateral opening could be larger than the cross-section of the coolant channel. The shape of the lateral opening can be adapted to the shape of the cross-section of the coolant channel. For instance, the pipe channel could have a circular cross-section, but the lateral opening could have an oblong cross-section, corresponding to an oblong cross-section of the coolant channel.

If the connection pipe is disposed right at the end of the coolant channel, a single lateral opening is generally sufficient. However, in particular if the coolant channel continues beyond the position of the connection pipe, it is preferred that the pipe wall comprises two lateral openings arranged on opposite sides of the pipe channel.

The coolant channel is normally provided by a drilling process or per direct casting, i.e. it is drilled or cast into the cooling plate body. Likewise, the at least one lateral opening is normally drilled into the pipe wall. These drilling processes can be combined in a preferred embodiment, in which the coolant channel and the at least one lateral opening are formed by a single drill hole. In other words, a single drill hole or drill channel is formed in the cooling plate body and also traverses the pipe wall. This means that the connection pipe is inserted into the receiving bore before the coolant channel is formed, or at least before it is formed entirely. The coolant channel—or at least the portion near the receiving bore—is then formed by a drilling process that also forms the at least one lateral opening. It will be understood that this embodiment ensures that the at least one lateral opening has the same cross-section as the coolant channel and is aligned with the coolant channel.

According to one embodiment, the coolant channel comprises an end opening communicating with the outside of the cooling plate body, wherein the pipe wall sealingly closes the coolant channel between the at least one lateral opening and the end opening. As mentioned above, the coolant channel is normally produced by drilling into the cooling plate body. The drilling operation produces an end opening at one end of the coolant channel, namely where the drill has been introduced into the cooling plate body. An end opening could also result from a casting process. According to prior art, such an end opening is often closed by a dedicated plug, which needs to be produced according to the size of the end opening, inserted and secured inside the end opening, normally by welding. In this embodiment, there is no need for such a plug since the pipe wall sealingly closes the coolant channel with respect to the end opening. The at least one lateral opening is disposed opposite the end opening to enable fluid communication between the pipe channel and the coolant channel. It is understood that eliminating the need for a dedicated plug greatly reduces the production costs for the cooling plate.

In another embodiment, the end portion of the connection pipe has a first outer dimension perpendicular to the bore direction that is greater than a second outer dimension of an external portion of the connection pipe that is disposed outside the receiving bore. The (first/second) outer dimension or external dimension may e.g. be a diameter of the respective portion. Either way, it is a dimension perpendicular to the bore direction. More specifically, it may be a dimension perpendicular to the bore direction and perpendicular to a direction of the coolant channel (or its central axis, as mentioned below). In this embodiment, the end portion is thickened and/or widened with respect to the external portion that is disposed outside the receiving bore, i.e. outside the cooling plate body. This embodiment can in particular be employed if one dimension of the coolant channel is greater than a dimension of the pipe channel. In such a case, the dimensions of a lateral opening are preferably adapted to those of the coolant channel. For example, the coolant channel could be oblong with one dimension being greater than a diameter of a circular pipe channel. In this case, a widened end portion could include a likewise oblong lateral opening with corresponding dimensions.

In embodiments, the connection pipe may have an end portion with enlarged diameter (and thicker wall) than the rest of the connection pipe, reinforcing the connection and facilitating the sealing.

Preferably, the cooling plate body has a general slab shape and comprises a plurality of coolant channels extending in a longitudinal direction of the cooling plate body, wherein two receiving bores are provided for each coolant channel at opposite extremities thereof, a connection pipe being form-fittingly received by its end portion in a respective receiving bore. In such an embodiment, the connection pipes correspond to an inlet and an outlet of the cooling channel. The slab shape of the cooling plate body can be produced by a single casting operation. The coolant channels can be provided in the casting operation or they could be drilled afterwards.

As explained above, the cover portion separates the coolant channel from the rear face at least on the first side of the receiving bore. In some embodiments, the cover portion is missing on another side of the receiving bore.

According to such an embodiment, on a second side of the receiving bore opposite the at least one lateral opening, the coolant channel is open towards the rear face and the connection pipe is welded to the cooling plate body at least partially away from the rear face. The second side is normally disposed opposite the first side with respect to the receiving bore. The cover portion is missing here and may have been removed after the coolant channel has been formed (e.g. before or after drilling of the receiving bore, but preferably before insertion of the connection pipe). Since the coolant channel is open towards the rear face on this second side, a considerable part of the end section is accessible from the outside. This is used to apply a welding connection not (only) near the rear face, but at least partially away from the rear face, e.g. inside the coolant channel.

Normally, the coolant channel as well as the pipe channel are symmetrical and each have a respective central axis. Normally, the coolant flow between the coolant channel and the pipe channel can be optimized when a first central axis of the coolant channel and a second central axis of the pipe channel intersect. Therefore, the first and second central axis are disposed in a single geometric plane. In other words, the coolant channel and the pipe channel are of course arranged at an angle, e.g. a right angle, but they are not offset with respect to each other. If the two channels are offset so that their respective central axes do not intersect, the coolant flow may still be fairly good, though, in particular if the offset is not to great.

In some cases, the connection pipe not only establishes a connection with a single coolant channel. For example, in cooling panels referred to as "double bore" the coolant channels are paired, being drilled adjacent one another and communicating with a same connection pipe at each end.

In one such embodiment, the cooling plate body comprises two coolant channels, wherein, at least adjacent the receiving bore on a first side thereof, at least one coolant channel is spaced in the bore direction from the rear face by the cover thickness of the cover portion and extends in the bore direction over the width, the receiving bore extends from the rear opening into both coolant channels, and the pipe channel of the connection pipe communicates with both coolant channels. Normally, both channels are spaced from the rear face by the same cover thickness and extend over the same width. They are normally disposed in proximity to each other, with a separating wall in between, and are running parallel. The connection pipe provides a connection to both coolant channels. It will be apparent that a dimension (e.g. diameter) of the pipe channel is normally considerably greater than a dimension (e.g. diameter) of each individual coolant channel. For instance, a cross-section of the pipe channel may correspond approximately to the combined cross-section of both coolant channels. In practice, the cooling panel includes a plurality of coolant channels pairs, each pair communicating with one connection pipe at each end.

The disclosure further provides a process for manufacturing a cooling plate for a metallurgical furnace. The method comprises providing a cooling plate body with a front face and an opposite rear face as well as providing a connection pipe having a pipe channel that is straight in an end portion of the connection pipe. In another step of the method, a receiving bore is provided in the cooling plate body that extends from a rear opening on the rear face towards the front face. The receiving bore may in particular be provided by drilling into the cooling plate body. It should be noted that the receiving bore may be provided before or after the connection pipe is provided. In yet another step, the end portion of the connection pipe is inserted through the rear opening so that it is form-fittingly received in the receiving bore, thereby connecting the connection pipe to the cooling plate. In particular, the connection pipe may be press-fitted into the receiving bore.

In another step of the method, at least one coolant channel is provided in the cooling plate body so that at least adjacent the receiving bore on a first side thereof, the coolant channel is spaced in the bore direction from the rear face by a cover thickness of a cover portion and extends in the bore direction over a width, the coolant channel communicates with the rear opening and the receiving bore extends from the rear opening into the coolant channel, and when the end portion is received in the receiving bore, it extends into the receiving bore in the bore direction beyond the cover thickness and is form-fittingly received along at least a portion of a width of the coolant channel, which form fit prevents movement perpendicular to the bore direction with respect to the cooling plate body. Preferably, the coolant channel is formed by drilling. It should be noted that providing the coolant channel may be performed before or after the connection pipe is inserted into the receiving bore.

Preferred embodiments of the inventive method correspond to those of the inventive cooling plate and mostly will not be discussed here again.

According to one embodiment, the end portion is inserted into the coolant channel after the coolant channel has been formed, e.g. drilled. It is preferred, though, that the coolant channel is drilled into the cooling plate body after the end portion is inserted into the receiving bore.

Preferably, at least one lateral opening in a pipe wall of the connection pipe is drilled along with the coolant channel in a single drilling operation. In other words, in a single drilling operation a single drilling hole is formed that extends through the cooling plate body (as the coolant channel) and through the pipe wall (as the at least one lateral opening).

According to a preferred embodiment of the method, a pipe wall of the connection pipe comprises at least one lateral opening and the coolant channel is drilled into the cooling plate body before the end portion is inserted into the receiving bore so that the pipe channel communicates with the coolant channel through the at least one lateral opening and the pipe wall sealingly closes the coolant channel between the at least one lateral opening and an end opening of the coolant channel that communicates with the outside of the cooling plate body. The end opening has already been explained above with respect to the cooling plate. In this embodiment, the cooling channel with the end opening is provided before the connection pipe is inserted into the receiving bore. When the connection pipe has been inserted, its pipe wall closes the cooling channel in relation to the end opening, thus eliminating the need for a dedicated plug.

In a preferred embodiment of the method, the connection pipe is welded to the cooling plate body. If the coolant channel is drilled after the end portion is inserted into the receiving bore, welding may be performed before or after the coolant channel is drilled. Preferred types of welding connection have been discussed above in context with the inventive cooling plate. Preferably, a countersink is formed around the receiving bore before the welding is performed and a welding connection is disposed inside the countersink.

According to one embodiment, the cover portion is removed in a removal region on a second side of the receiving bore opposite the at least one lateral opening before the connection pipe is welded to the cooling plate body on the second side of the receiving bore, which welding is at least partially performed away from the rear face. In this case, the cover portion is left intact on the first side of the receiving bore, but on the second side, which is opposite the at least one lateral opening (and normally also opposite the first side), the cover portion is removed, e.g. by machining. The region where the cover portion has been removed is herein referred to as the removal region. Here, the coolant channel is open towards the rear face on this second side, wherefore a considerable part of the end section is accessible from the outside even after the connection pipe has been inserted into the receiving bore. Therefore, a welding process can be performed not only near the rear face, but also away from the rear face, e.g. inside the coolant channel. It will be understood that such a welding connection enhances the stability of the connection between the connection pipe and the cooling plate body.

BRIEF DESCRIPTION OF THE DRAWINGS

Preferred embodiments of the disclosure will now be described, by way of example, with reference to the accompanying drawings, in which.

DETAILED DESCRIPTION OF THE DRAWINGS

Figure 1:
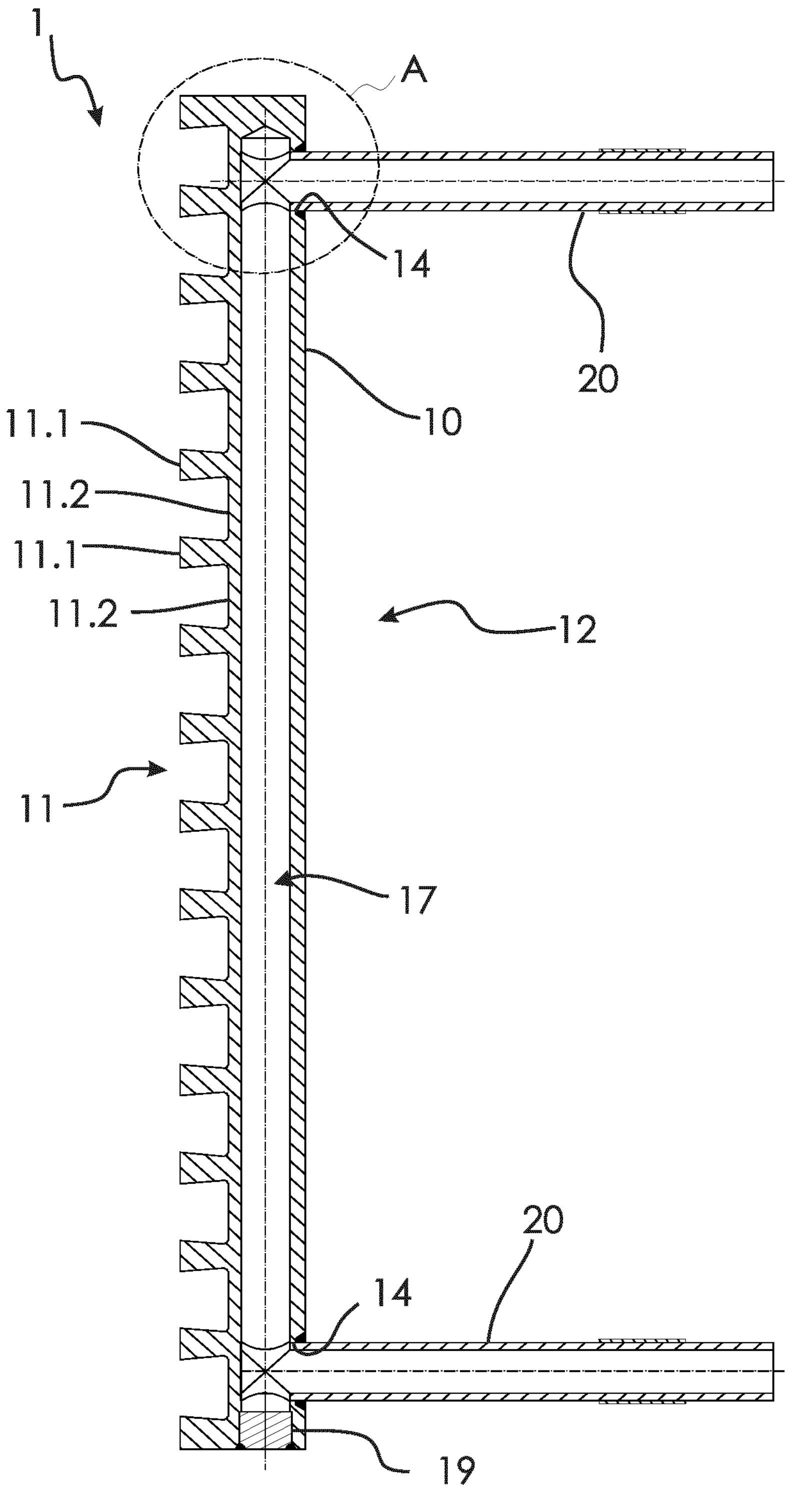
FIG. 1 is a sectional view illustrating a first embodiment of a cooling plate with an assembly of cooling plate body and a connection pipe according to the disclosure.
Figure 3:
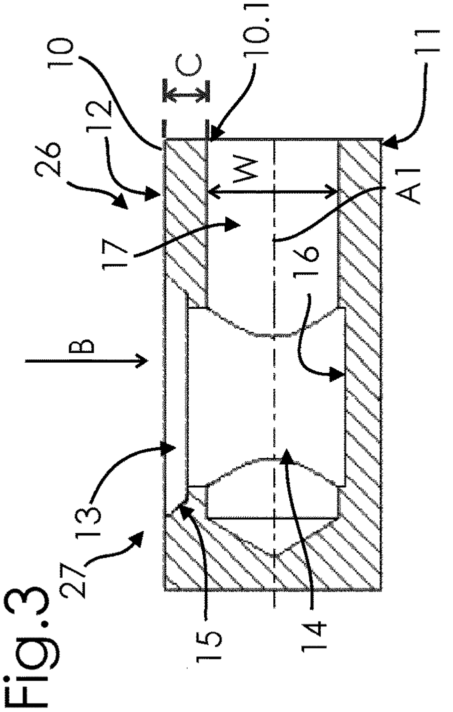
FIG. 3 is a sectional view of the cooling plate body corresponding to FIG. 2.

FIG. 1 shows an embodiment of the present cooling plate 1, in a longitudinal cross-section view in the thickness direction. The cooling plate has a metallic cooling plate body 10 that is typically formed from a slab e.g. a cast or forged body of metal, in particular copper or copper alloy.

The cooling plate body 10 has a front face generally indicated 11, also referred to as hot face, which is turned towards the furnace interior, and an opposite rear face 12, also referred to as cold face, which in use faces the inner surface of the furnace shell.

As is known in the art, the front face 11 of the cooling plate body 10 may advantageously have a structured surface, in particular with alternating ribs 11.1 and grooves 11.2. When the cooling plate 1 is mounted in the furnace, the grooves 11.2 and lamellar ribs 11.1 are generally arranged horizontally in order to provide an anchoring means for a refractory brick lining (not shown).

Reference sign 17 designates a coolant channel extending longitudinally in the body. Typically the cooling plate body 10 comprises a plurality of coolant channels 17 drilled in the body that run parallel to one another and are distributed along the width of the body. The coolant channels 17 are drilled through the shaped cooling plate body 10 from one longitudinal end to the other, whereby an end opening 18 is created that communicates with an outside of the cooling plate body 10. One end of the coolant channel 17 is blind (top end in FIG. 9) whereas end opening 18 at the drilling end is closed by a plug 19. In this embodiment, the coolant channel 17 is straight and has a circular cross-section. It is symmetric with respect to a first central axis A1. Drilling of the coolant channel 17 will also be discussed further below.

For each coolant channel 17, a top and bottom access hole is provided in the rear face, generally by drilling. In the following, these access holes are referred to as receiving bores 14. A metallic connection pipe 20 is fitted in each receiving bore 14 allowing fluid communication between the coolant channel and the cooling system of the blast furnace. Typically, the coolant fluid enters the coolant channel 17 via one of the receiving bores 14 and the associated connection pipe 20, and exits the coolant channel 17 though the other.

Figure 2:
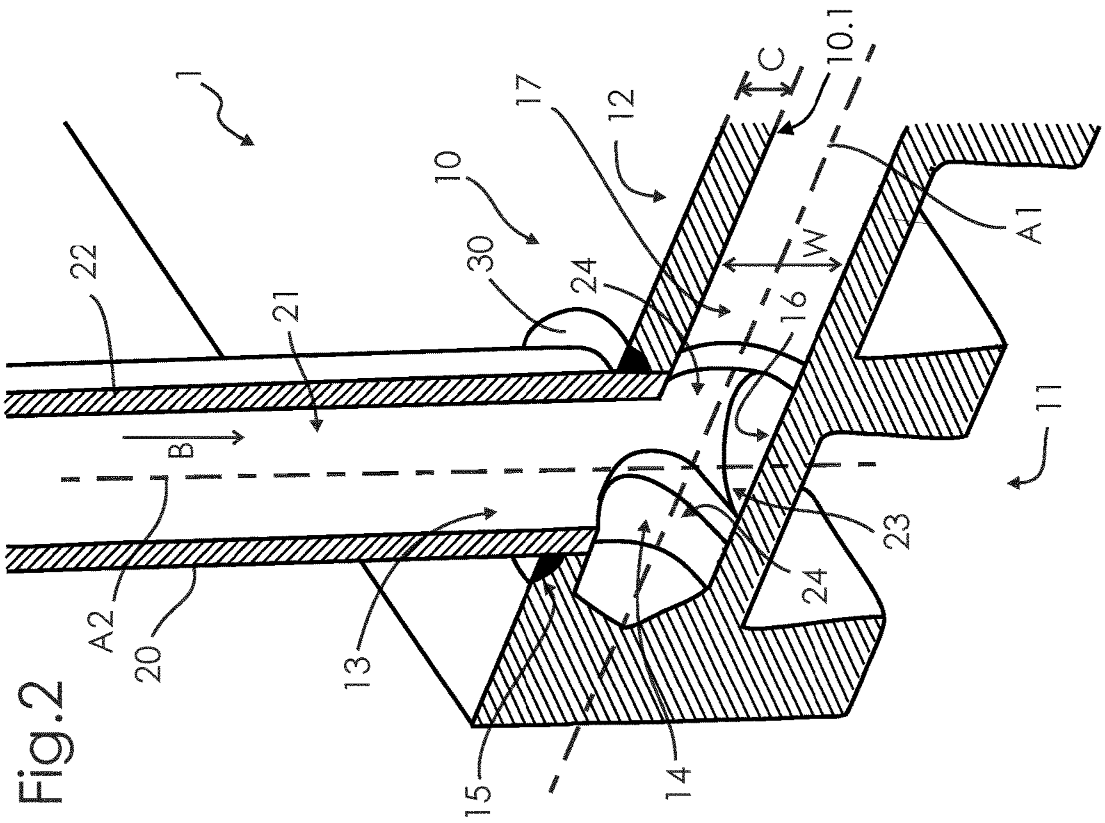
FIG. 2 is a perspective sectional view of detail A of FIG. 1, illustrating the assembly of the connection pipe to the cooling plate body.

Let us now refer to FIG. 2, which shows detail A of FIG. 1. As can be seen, the receiving bore 14 extends in a bore direction B from a rear opening 13 on the rear face 12 into the coolant channel 17. It even extends somewhat beyond the coolant channel and ends in a plain end surface 16. The receiving bore 14 has a circular cross-section that may be greater than the cross-section of the coolant channel 17. A countersink 15 is formed circumferentially about the rear opening 13. The coolant channel 17 is spaced from the rear face 12 by a cover portion 10.1 of the cooling plate body 10 on a first side 26 and a second side 27 of the receiving bore 14. In the bore direction B, the cover portion 10.1 has a cover thickness C that defines the spacing.

The cooling plate 1 also comprises a connection pipe 20 that also has a circular cross-section and comprises a pipe wall 22 that surrounds a pipe channel 21. The connection pipe 20 can be made of the same material as the cooling plate body 10. An end portion 23 of the connection pipe 20 has been inserted by press-fitting into the receiving bore 14 so that it abuts the end surface 16. By press fitting the end portion 23 into the receiving bore 14, it is form fittingly received in the receiving bore 14 along the entire width W of the coolant channel 17, which with W is the dimension of the coolant channel 17 in the bore direction B. Since in this case, the bore direction B is perpendicular to the first central axis A1, the width W corresponds to the diameter of the coolant channel 17. In the connection pipe 20 is symmetrical about a second central axis A2, which intersects the first central axis A1 at a right angle.

Figure 5:
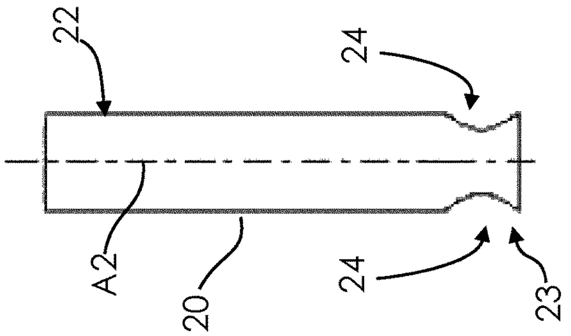
FIG. 5 is side view along the direction IV in FIG. 4.
Figure 4:
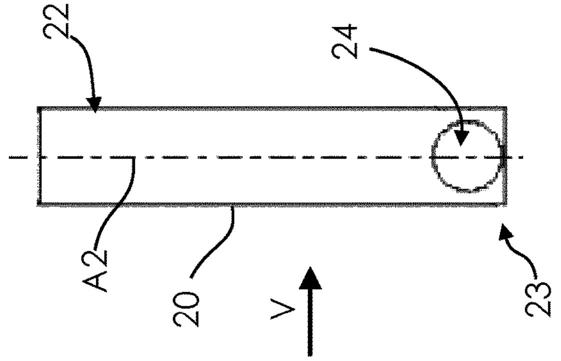
FIG. 4 is a side view of the connection pipe from FIG. 2.

The form fitting connection between the cooling plate body 10 and the connection pipe 20, which is enhanced by press-fitting, guarantees that any forces and torques acting between these two elements during operation of the cooling plate 1 can be transferred without leading to excessive pressure or stress. Mainly for sealing purposes, the connection is supplemented by a welding seam 30 that is applied in the countersink 15. In the embodiment shown, the welding seam 30 corresponds to an HV weld (single bevel groove weld). In order to provide an optimum coolant flow between the coolant channel 17 and the pipe channel 21, the pipe wall 22 comprises two lateral openings 24 (also visible in in FIGS. 4 and 5, which show the connection pipe 20 individually) that are arranged on opposite sides of the pipe channel 21, and face the first side 26 and the second side 27, respectively, of the receiving bore 14. Each lateral opening 24 has the same cross-section as the coolant channel 17 and is aligned with the coolant channel 17.

Figure 6:
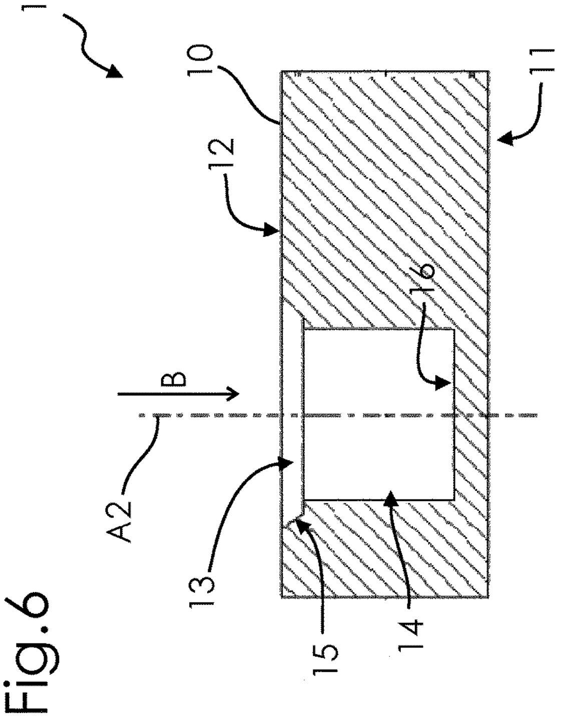
FIG. 6 is a sectional view illustrating a first stage of a method for producing the cooling plate from FIG. 1.
Figure 7:
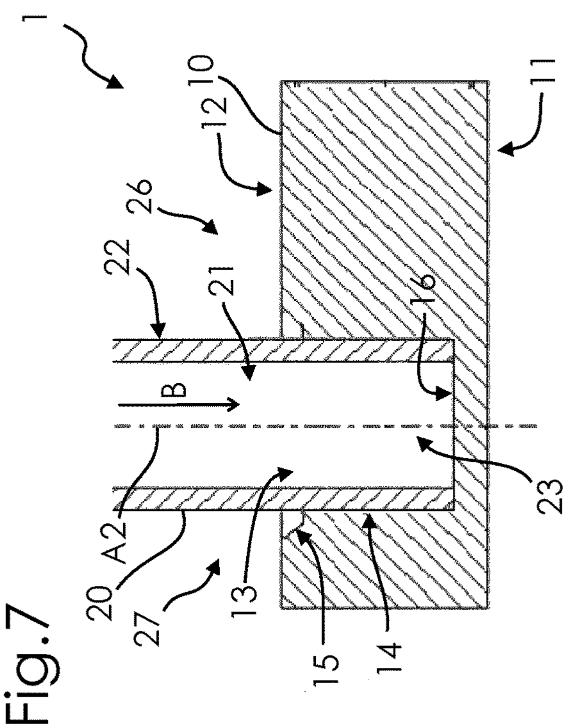
FIG. 7 is a sectional view illustrating a second stage of the method for producing the cooling plate.
Figure 8:
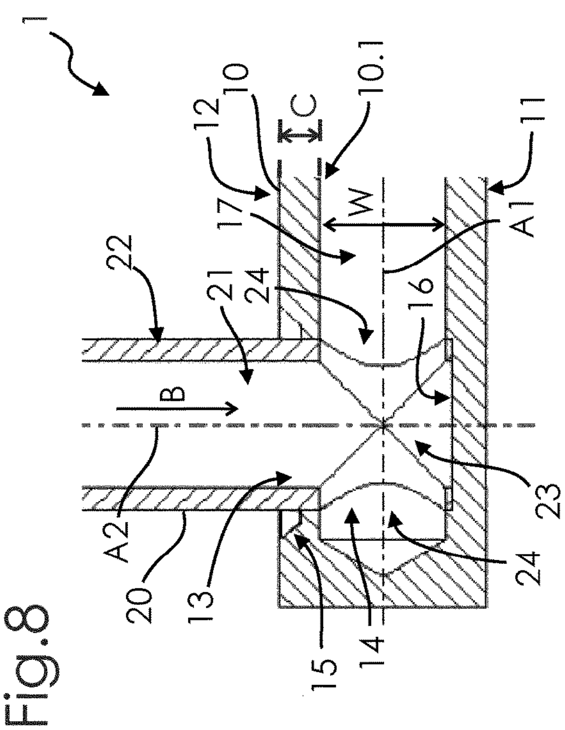
FIG. 8 is a sectional view illustrating a third stage of the method for producing the cooling plate.
Figure 9:
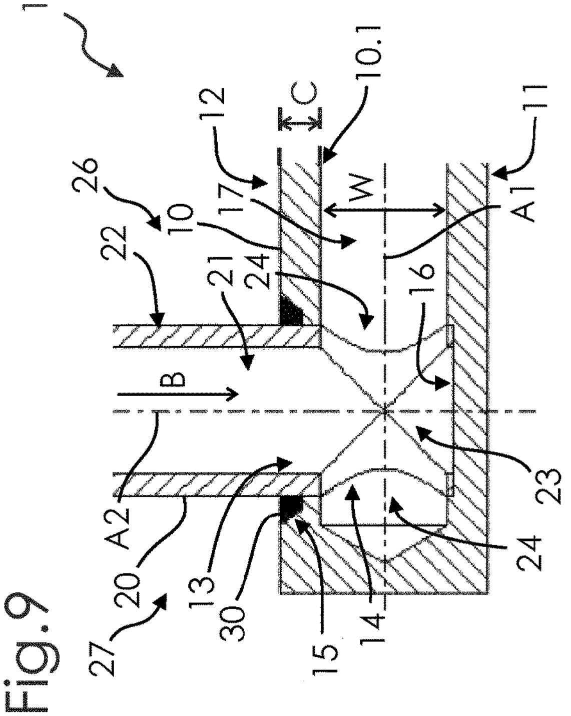
FIG. 9 is a sectional view illustrating a fourth stage of the method for producing the cooling plate.
Figure 11:
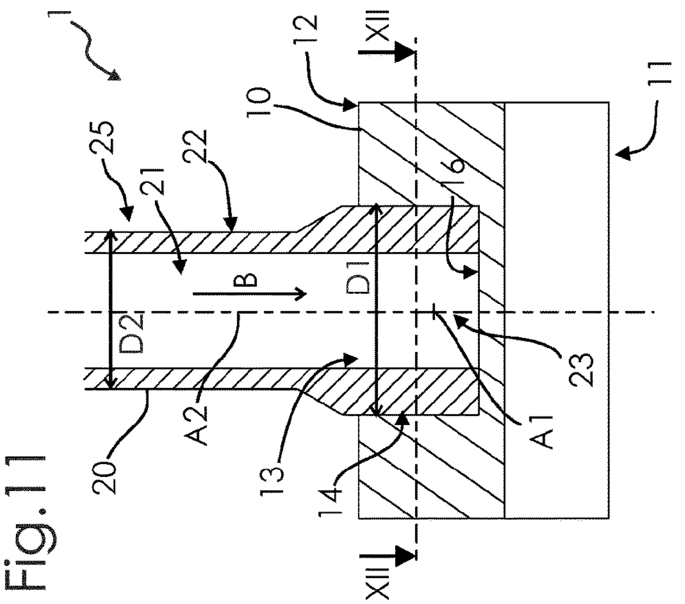
FIG. 11 is a sectional view along the line XI-XI in FIG. 10.
Figure 10:
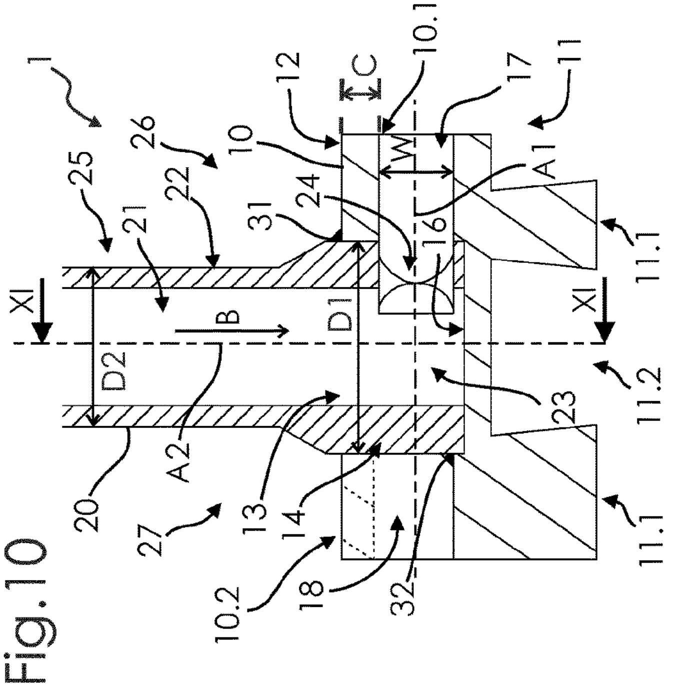
FIG. 10 is a sectional view of second embodiment of an inventive cooling plate.
Figure 12:
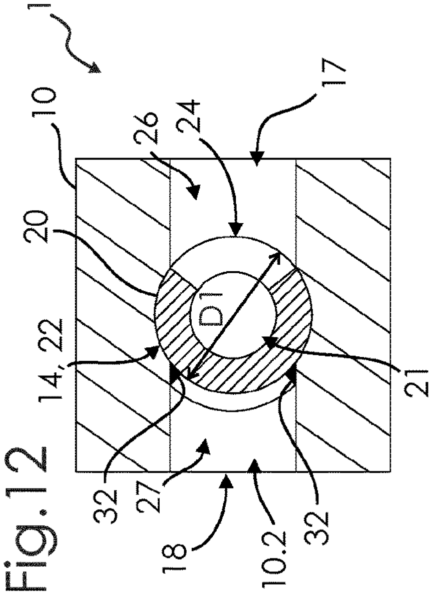
FIG. 12 is a sectional view along the line XII-XII in FIG. 11.
Figure 14:
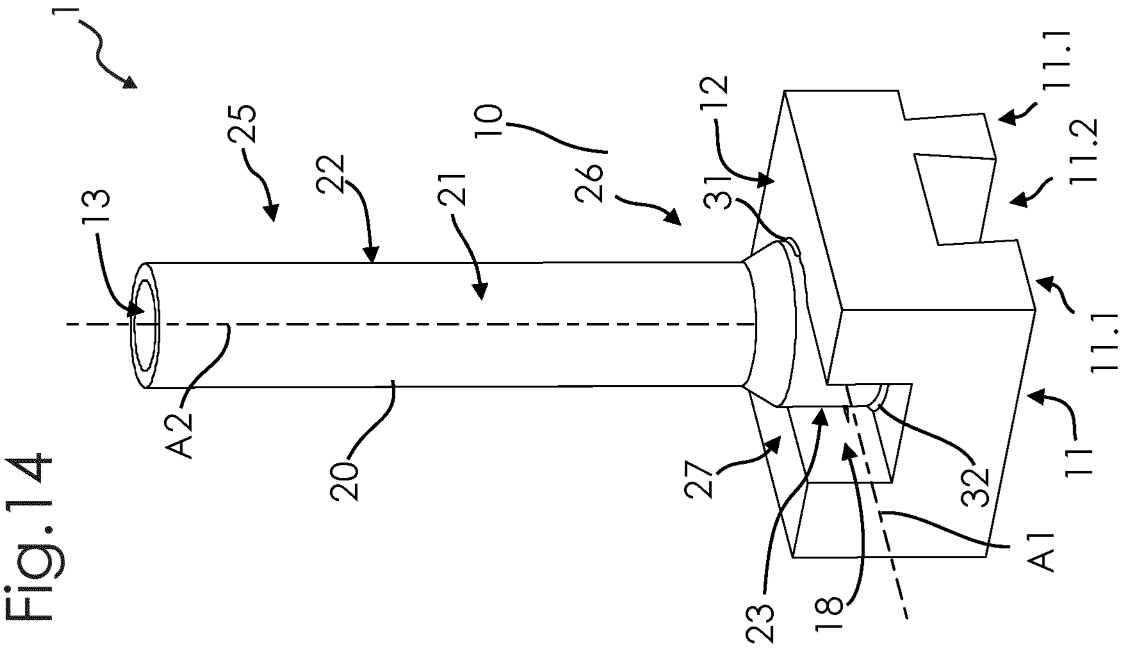
FIG. 14 is a perspective view of the cooling plate from FIG. 10.
Figure 13:
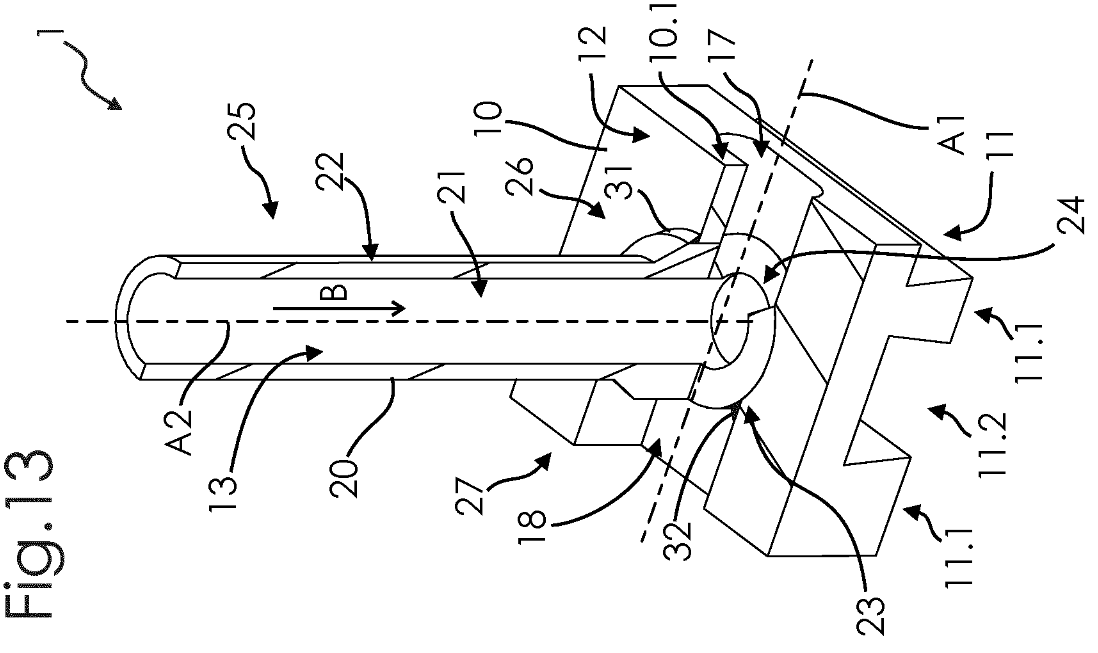
FIG. 13 is a cutaway view of the cooling plate from FIG. 10.

FIGS. 6 to 9 illustrate a method for producing the cooling plate 1. FIG. 6 illustrates a first stage of the method, in which the cooling plate body 10 is provided with the receiving bore 14 and the countersink 15. These can be produced by drilling or machining into the copper material of the cooling plate body 10. The coolant channel 17 has not yet been drilled. FIG. 7 illustrates another step, in which the connection pipe 20 is inserted by press fitting through the rear opening 13 into the receiving bore 14. For the press-fitting process, the outer diameter of the pipe wall 22 has to be somewhat greater (e.g. by a few millimetres or tenths of a millimetre) than the inner diameter of the receiving bore 14. The countersink 15 forms an annular, V-shaped groove around the rear opening 13. In a next stage of the method, as shown in FIG. 8, the coolant channel 17 and the lateral openings 24 are drilled with a single drilling process. This automatically guarantees that the lateral openings 24 have the same cross-section as the coolant channel 17 and are aligned with it. In a final stage of the method, which is illustrated in FIG. 9, the annular welding seam 30 is applied to provide a fluid-tight seal between the connection pipe 20 and the cooling plate body 10.

FIGS. 10 to 14 show a second embodiment of an inventive cooling plate 1, which is similar to the first embodiment and will insofar not be described again. One difference is that the coolant channel 17 here has an oblong shape, wherefore the width W is considerably smaller than the diameter of the pipe channel 21 (see FIG. 10), while a dimension of the coolant channel 17 perpendicular to the width W is considerably larger (see FIG. 12). Accordingly, the lateral opening 24 of the connecting pipe 20 widens towards the coolant channel 17. Also, in order to provide a seal inside the coolant channel 17 corresponding to its dimensions, the end portion 23 of the connecting pipe 20 has a first diameter D1 that is greater than a second diameter D2 of an external portion 25 that is disposed outside of the receiving bore 14. This increased thickness further reinforces the connection.

In this embodiment, the sealing function is particularly important, since the coolant channel 17 has an end opening 18 that is open toward the outside of the cooling plate body. In the first embodiment, such an end opening 18 is closed with a dedicated plug 19, which needs to be manufactured, inserted and secured inside the cooling plate body 10, leading to undesirable production costs. In this embodiment, however, the pipe wall 22 sealingly closes the coolant channel 17 between the lateral opening 24 and the end opening 18. Thus, coolant is prevented from flowing from the pipe channel 21 or the coolant channel 17 to the end opening 18. Also, the cover portion 10.1 has been removed, e.g. by machining, in a removal region 10.2 on the second side 27 of the receiving bore 14, as is indicated by the dotted lines in FIG. 10. Thus, the end portion 23 is accessible from the outside. In addition to a welding seam 31 on the first side 26 adjacent the rear opening 31, another welding seam 32 is applied on the second side 27 extending away from the rear face 12 towards the front face 11. Application of this welding seam 32 is facilitated or made possible by the removal of the cover portion 10.1 in the removal region 10.2. Compared to the previous embodiment, it may be noted that connection pipe 20 has only one end opening 24, which is turned towards the first side 26, i.e. to receive the flow of coolant from channel 17.

Figure 16:
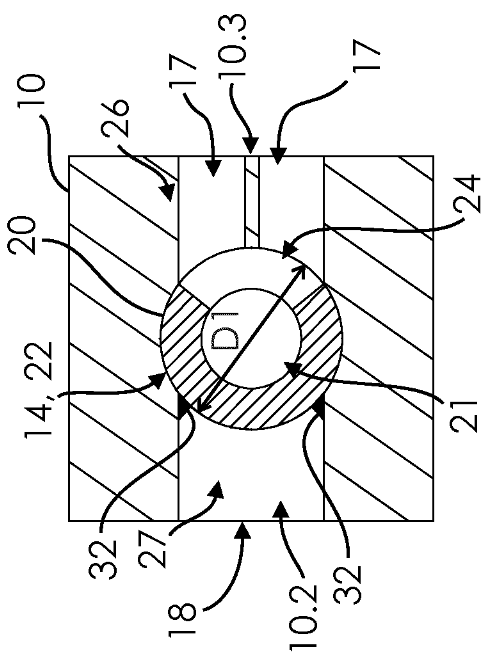
FIG. 16 is a sectional view of the cooling plate from FIG. 15.
Figure 15:
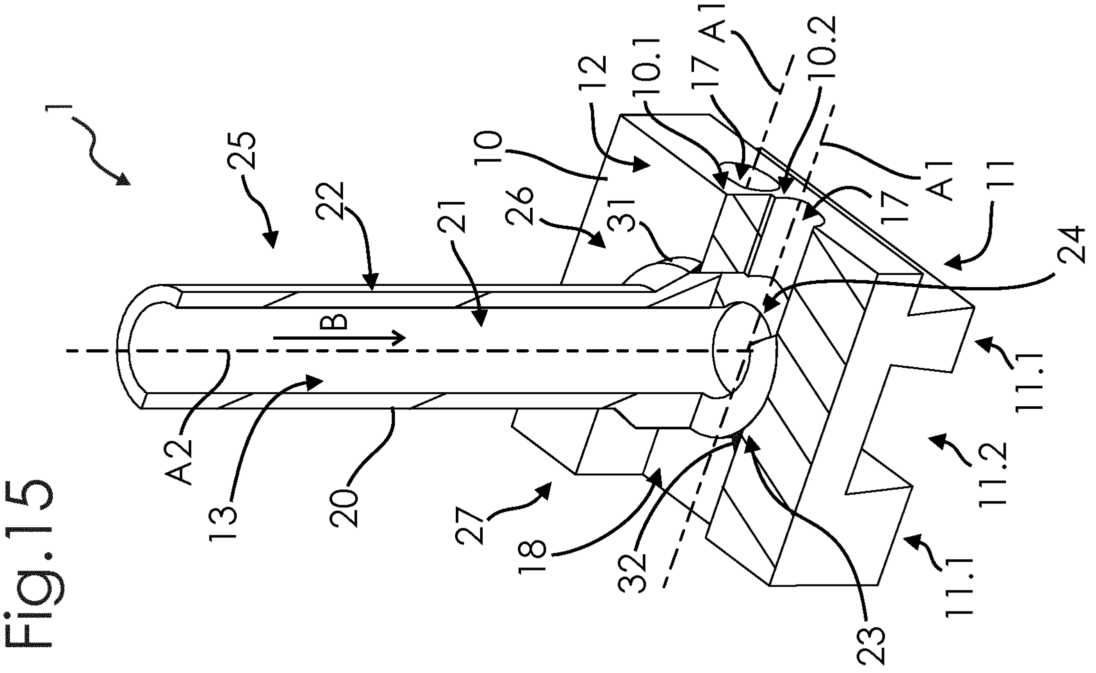
FIG. 15 is a cutaway view of a third embodiment of an inventive cooling plate.

FIGS. 15 and 16 show a third embodiment of an inventive cooling plate 1, which is mostly identical to the second embodiment. However, in this case, the coolant channels are drilled as adjacent pairs. As seen in the figures, cooling plate body 10 comprise two parallel coolant channels 17 that are thus spaced by a separating wall 10.3 in between. The pipe channel 21 communicates with both coolant channels 17 through a single lateral opening 24. Alternatively, there could be two lateral openings 24, one for each coolant channel 17. The receiving bore 14 extends from the rear opening 13 into both coolant channels 17 and beyond them up to a plain end surface 16.

Although in the present embodiment the coolant channels 17 are formed by drilling, they may alternatively by obtained by casting. Similarly, the rear opening 13 and receiving bore 14 could be formed by casting together with the cooling plate body 10. In terms of materials, although copper (and copper alloys) is widely used for cooling plate bodies 10, other appropriate materials may be used, e.g. cast iron.

The invention claimed is:

1. A method for manufacturing a cooling plate for a metallurgical furnace, the method including the following steps:

providing a cooling plate body having a front face and an opposite rear face;

providing a connection pipe having a pipe channel that is straight in an end portion of the connection pipe;

providing a receiving bore in the cooling plate body that extends in a bore direction from a rear opening on the rear face towards the front face; and inserting the end portion of the connection pipe through the rear opening so that it is form-fittingly received in the receiving bore, thereby connecting the connection pipe to the cooling plate body, wherein at least one coolant channel is provided inside the cooling plate body, so that at least adjacent the receiving bore on a first side thereof, the coolant channel is spaced in the bore direction from the rear face by a cover thickness of a cover portion and extends in the bore direction over a width, the coolant channel communicates with the rear opening and the receiving bore extends from the rear opening into the coolant channel, and when the end portion is received in the receiving bore, it extends into the receiving bore in the bore direction beyond the cover thickness and is form-fittingly received along at least a portion of the width of the coolant channel, which form fit prevents movement perpendicular to the bore direction with respect to the cooling plate body.

2. The method according to claim 1, wherein the coolant channel is drilled into the cooling plate body after the end portion is inserted into the receiving bore; and at least one lateral opening in a pipe wall of the connection pipe is drilled along with the coolant channel in a single drilling operation.

3. The method according to claim 1, wherein a pipe wall of the connection pipe comprises at least one lateral opening, and the coolant channel is drilled into the cooling plate body before the end portion is inserted into the receiving bore so that the pipe channel communicates with the coolant channel through the at least one lateral opening and the pipe wall sealingly closes the coolant channel between the at least one lateral opening and an end opening of the coolant channel that communicates with the outside of the cooling plate body.

4. The method according to claim 1, wherein the connection pipe is welded to the cooling plate body.

5. The method according to claim 3, wherein the cover portion is removed in a removal region on a second side of the receiving bore opposite the at least one lateral opening before the connection pipe is welded to the cooling plate body on the second side of the receiving bore, which welding is at least partially performed away from the rear face.

6. A cooling plate for a metallurgical furnace, comprising a cooling plate body having with a front face for facing the inside of the metallurgical furnace, an opposite rear face and at least one coolant channel inside the cooling plate body, wherein the coolant channel communicates with a rear opening on the rear face; and a connection pipe connected to the cooling plate body so that a pipe channel of the connection pipe communicates with the coolant channel, said connection pipe being adapted for carrying coolant fluid to or from said coolant channel;

wherein the cooling plate body comprises a receiving bore that extends in a bore direction from the rear opening into the coolant channel, wherein, at least adjacent the receiving bore on a first side of the receiving bore, the coolant channel is spaced in the bore direction from the rear face by a cover thickness of a cover portion and extends in the bore direction over a width, wherein an end portion of the connection pipe extends into the receiving bore in the bore direction beyond the cover thickness and is form-fittingly received in the receiving bore along at least a portion of the width of the coolant channel, which form fit prevents movement perpendicular to the bore direction with respect to the cooling plate body, wherein the pipe channel is straight in the end portion.

7. The cooling plate according to claim 6, wherein the end portion is press fitted into the receiving bore.

8. The cooling plate according to claim 6, wherein the end portion is form-fittingly received in the receiving bore along at least 50% of the width of the coolant channel.

9. The cooling plate according to claim 8, wherein the end portion is form-fittingly received in the receiving bore along the entire width of the coolant channel.

10. The cooling plate according to claim 9, wherein the receiving bore and the end portion extend in the bore direction beyond the coolant channel.

11. The cooling plate according to claim 6, wherein the connection pipe is connected to the cooling plate body by a welding connection proximate to the rear opening; and the cooling plate body comprises a countersink circumferentially disposed around the rear opening, wherein the welding connection is disposed inside the countersink.

12. The cooling plate according to claim 6, wherein a pipe wall of the connection pipe comprises at least one lateral opening through which the pipe channel communicates with the coolant channel.

13. The cooling plate according to claim 12, wherein a cross-section of the at least one lateral opening corresponds to a cross-section of the coolant channel and the at least one lateral opening is aligned with the coolant channel.

14. The cooling plate according to claim 12, wherein the pipe wall comprises two lateral openings arranged on opposite sides of the pipe channel.

15. The cooling plate according to claim 12, wherein the coolant channel and the at least one lateral opening are formed by a single drill hole.

16. The cooling plate according to claim 12, wherein the coolant channel comprises an end opening communicating with the outside of the cooling plate body, wherein the pipe wall sealingly closes the coolant channel between the at least one lateral opening and the end opening.

17. The cooling plate according to claim 6, wherein the end portion of the connection pipe has a first outer dimension perpendicular to the bore direction that is larger than a second outer dimension of an external portion of the connection pipe that is disposed outside the receiving bore.

18. The cooling plate according to claim 6, wherein the cooling plate body has a general slab shape and comprises a plurality of coolant channels extending in a longitudinal direction of the cooling plate body, wherein two receiving bores are provided for each coolant channel at opposite extremities thereof, and a connection pipe is provided for each receiving bore so that its end portion is form fittingly received in the respective receiving bore.

19. The cooling plate according to claim 12, wherein on a second side of the receiving bore opposite the at least one lateral opening, the coolant channel is open towards the rear face and the connection pipe is welded to the cooling plate body at least partially away from the rear face.

20. The cooling plate according to claim 6, wherein a first central axis of the coolant channel and a second central axis of the pipe channel intersect.

21. The cooling plate according to claim 6, wherein the cooling plate body comprises two coolant channels, wherein, at least adjacent the receiving bore on a first side thereof, at least one coolant channel is spaced in the bore direction from the rear face by the cover thickness of the cover portion and extends in the bore direction over the width, the receiving bore extends from the rear opening into both coolant channels, and the pipe channel of the connection pipe communicates with both coolant channels, wherein the two coolant channels are disposed in proximity to each other with a separating wall in between them and are running parallel.

* * * * *